(12) United States Patent
Lindahl et al.

(10) Patent No.: US 9,481,452 B2
(45) Date of Patent: Nov. 1, 2016

(54) HYDRAULIC ACTUATOR FOR SEMI LEVERED LANDING GEAR

(75) Inventors: Gary M. Lindahl, Newcastle, WA (US); Mitchell Loren Ray Mellor, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 1388 days.

(21) Appl. No.: 12/951,861

(22) Filed: Nov. 22, 2010

(65) Prior Publication Data

US 2012/0126055 A1  May 24, 2012

(51) Int. Cl.
*B64C 25/22* (2006.01)
*B64C 25/34* (2006.01)
*B64C 25/60* (2006.01)
*F15B 15/16* (2006.01)

(52) U.S. Cl.
CPC ........... *B64C 25/22* (2013.01); *B64C 25/34* (2013.01); *B64C 25/60* (2013.01); *F15B 15/16* (2013.01)

(58) Field of Classification Search
USPC .......... 244/102 R, 102 A, 102 SL, 102 SS
See application file for complete search history.

(56) References Cited

U.S. PATENT DOCUMENTS

| | | | |
|---|---|---|---|
| 2,193,736 A | 3/1940 | Onions | |
| 2,783,744 A * | 3/1957 | Tennis | 91/23 |
| 2,932,281 A | 4/1960 | Moskowitz | |
| 3,082,980 A | 3/1963 | Lucien | |
| 3,083,937 A | 4/1963 | Bainbridge et al. | |
| 3,188,922 A | 6/1965 | Cruse | |
| 3,237,726 A | 3/1966 | Deyerling | |
| 3,290,038 A | 12/1966 | Tollar | |
| 3,322,376 A | 5/1967 | Neilson et al. | |
| 3,335,642 A | 8/1967 | Rosaen | |
| 3,426,651 A | 2/1969 | Arendarski | |
| 3,533,613 A | 10/1970 | Bendicsen | |
| 3,568,705 A | 3/1971 | Boyadjieff et al. | |
| 3,578,303 A | 5/1971 | Fullam | |
| 3,724,832 A | 4/1973 | Ceska | |
| 3,845,919 A | 11/1974 | Jenny | |
| 3,869,861 A | 3/1975 | Case | |
| 3,920,084 A | 11/1975 | Russell | |

(Continued)

FOREIGN PATENT DOCUMENTS

| | | |
|---|---|---|
| EP | 0295174 | 12/1988 |
| EP | 0614804 A1 | 9/1994 |

(Continued)

OTHER PUBLICATIONS

Mellor, "Air-Ground Detection System for Semi-Levered Landing Gear", U.S. Appl. No. 13/031,525, filed Feb. 21, 2011, 69 pages.

(Continued)

*Primary Examiner* — Justin Benedik
(74) *Attorney, Agent, or Firm* — Yee & Associates, P.C.

(57) ABSTRACT

A device including a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. A manifold is connected to the first, second, and third hydraulic pistons. The manifold is disposed relative to the first, second, and third hydraulic pistons such that a fluid moving in the manifold can control positions of the first, second, and third hydraulic pistons.

19 Claims, 9 Drawing Sheets

(56) References Cited

U.S. PATENT DOCUMENTS

| | | | |
|---|---|---|---|
| 4,007,894 A | | 2/1977 | Hartel |
| 4,061,295 A | | 12/1977 | Somm |
| 4,075,929 A | * | 2/1978 | Peterson .................... 91/168 |
| 4,088,286 A | * | 5/1978 | Masclet et al. ......... 244/102 SL |
| 4,284,255 A | | 8/1981 | Masclet et al. |
| 4,291,850 A | | 9/1981 | Sharples |
| 4,359,199 A | | 11/1982 | Kramer et al. |
| 4,381,857 A | | 5/1983 | Cook |
| 4,402,477 A | | 9/1983 | Turiot et al. |
| 4,445,672 A | | 5/1984 | Turiot |
| 4,457,212 A | * | 7/1984 | Unger et al. ................. 92/18 |
| 4,746,086 A | | 5/1988 | Happ |
| 4,749,152 A | | 6/1988 | Veaux et al. |
| 4,749,452 A | | 6/1988 | LaConti et al. |
| 4,770,372 A | | 9/1988 | Ralph |
| 4,816,828 A | | 3/1989 | Feher |
| 4,869,444 A | | 9/1989 | Ralph |
| 4,892,270 A | | 1/1990 | Derrien et al. |
| 4,940,197 A | | 7/1990 | Putnam |
| 5,029,775 A | | 7/1991 | Abramovitsh |
| 5,086,995 A | | 2/1992 | Large |
| 5,094,407 A | * | 3/1992 | Jampy et al. ........... 244/104 FP |
| 5,140,894 A | | 8/1992 | Snyder et al. |
| 5,148,896 A | | 9/1992 | Ralph |
| 5,157,267 A | | 10/1992 | Shirata et al. |
| 5,219,152 A | | 6/1993 | Derrien et al. |
| 5,271,314 A | | 12/1993 | Derrien |
| 5,299,761 A | | 4/1994 | Robin et al. |
| 5,310,140 A | | 5/1994 | Veaux et al. |
| 5,390,586 A | * | 2/1995 | Jones ............................. 92/79 |
| 5,396,973 A | * | 3/1995 | Schwemmer et al. ..... 188/267.1 |
| 5,429,323 A | | 7/1995 | Derrien et al. |
| 5,460,340 A | | 10/1995 | White |
| 5,908,174 A | | 6/1999 | Churchill et al. |
| 6,182,925 B1 | | 2/2001 | Kilner et al. |
| 6,237,407 B1 | | 5/2001 | Nance |
| 6,345,564 B1 | | 2/2002 | Kilner et al. |
| 6,575,405 B2 | | 6/2003 | Bryant et al. |
| 7,426,983 B2 | | 9/2008 | Ducos et al. |
| 7,802,488 B2 | * | 9/2010 | Bucheton et al. ........... 74/89.23 |
| 8,104,711 B2 | * | 1/2012 | Bennett et al. ......... 244/102 SL |
| 2003/0033927 A1 | | 2/2003 | Bryant et al. |
| 2005/0011991 A1 | | 1/2005 | Ducos et al. |
| 2006/0220917 A1 | | 10/2006 | Nance |
| 2007/0068754 A1 | | 3/2007 | Furgala |
| 2007/0144846 A1 | * | 6/2007 | Bucheton et al. ............ 188/297 |
| 2007/0194172 A1 | | 8/2007 | Luce et al. |
| 2009/0050736 A1 | | 2/2009 | Bennett et al. |
| 2009/0108131 A1 | | 4/2009 | Lavigne et al. |
| 2009/0200760 A1 | | 8/2009 | Gartner et al. |
| 2009/0210105 A1 | * | 8/2009 | Lusby et al. .................... 701/15 |
| 2010/0096499 A1 | | 4/2010 | Luce et al. |
| 2010/0116930 A1 | | 5/2010 | Griffin |
| 2010/0116931 A1 | | 5/2010 | Wilby |
| 2010/0181423 A1 | | 7/2010 | Martin et al. |
| 2010/0187353 A1 | | 7/2010 | Masson et al. |
| 2010/0219290 A1 | | 9/2010 | Luce |
| 2011/0025966 A1 | | 2/2011 | Sakai |
| 2011/0233327 A1 | * | 9/2011 | Mellor et al. ............. 244/102 A |
| 2012/0211600 A1 | | 8/2012 | Mellor |
| 2012/0247892 A1 | | 10/2012 | Cottet |
| 2015/0266592 A1 | | 9/2015 | Mellor |

FOREIGN PATENT DOCUMENTS

| | | |
|---|---|---|
| EP | 0743245 | 11/1996 |
| EP | 1041001 | 10/2000 |
| EP | 1749741 | 2/2007 |
| EP | 2489591 A1 | 8/2012 |
| FR | 2849830 A1 | 7/2004 |
| GB | 594541 A | 11/1947 |
| GB | 1024455 A | 3/1966 |
| GB | 1591689 A | 6/1981 |
| GB | 2101542 | 1/1983 |
| GB | 2428650 | 2/2007 |
| JP | 2002506772 A | 3/2002 |
| JP | 2002200976 A | 7/2002 |
| JP | 2009505884 A | 2/2009 |
| WO | 2006094145 | 9/2006 |
| WO | 2006133902 | 12/2006 |
| WO | 2007015104 | 2/2007 |
| WO | 2007015104 A1 | 2/2007 |
| WO | WO2009047367 A2 | 4/2009 |
| WO | 2011119283 | 9/2011 |

OTHER PUBLICATIONS

Cottet, "Landing Gear System", U.S. Appl. No. 13/078,075, filed Apr. 1, 2011, 48 pages.

"Semi-Levered Gear Performs During Boeing 777-300ER Flight-Tests", Boeing news release, LeBourget, France, Jun. 2003, accessed May 15, 2012, 2 pages http://www.boeing.com/news/releases/2003/photorelease/q2/pr_030618g1.html.

PCT Search Report dated Aug. 4, 2011 regarding application PCT/US2011/025966 dated Feb. 23, 2011, applicant reference 09-0834PCT, applicant The Boeing Company, 13 pages.

EP Search Report dated Jun. 22, 2012 regarding application 12156210.2-2422, applicant reference NAM/P120557EP00, applicant The Boeing Company, 6 pages.

Long, "Semi-Lever Landing Gear", The Boeing Company, Oct. 2001, 13 pages.

Final Office Action, dated Jul. 5, 2013, regarding U.S. Appl. No. 13/031,525, 21 pages.

Extended European Search Report, dated Aug. 22, 2014, regarding Application No. 11188624.8, 10 pages.

State Intellectual Property Office of PRC Notification of First Office Action and English Translation, dated Mar. 3, 2015, regarding Application No. 201110386094.7, 13 pages.

Notice of Reasons for Rejection and English Translation dated Apr. 30, 2015, regarding Japanese Patent Application No. 2011-242030, 7 pages.

Office Action, dated Jun. 20, 2014, regarding U.S. Appl. No. 13/031,525, 16 pages.

Notice of Allowance, dated Jul. 28, 2014, regarding U.S. Appl. No. 13/031,525, 9 pages.

Office Action, dated Jun. 2, 2014, regarding U.S. Appl. No. 13/031,525, 37 pages.

Office Action, dated Jul. 30, 2014, regarding U.S. Appl. No. 13/474,332, 26 pages.

Extended European Search Report, dated Mar. 4, 2014, regarding Application No. EP12159953.4, 6 pages.

Office Action, dated Mar. 24, 2015, regarding U.S. Appl. No. 14/479,319, 14 pages.

European Patent Office Communication, dated Feb. 16, 2016, regarding Application No. 12156210.2, 4 pages.

Final Office Action, dated Nov. 13, 2014, regarding U.S. Appl. No. 13/474,332, 26 pages.

Notice of Allowance, dated Sep. 4, 2014, regarding U.S. Appl. No. 13/078,075, 16 pages.

Office Action, dated Jul. 21, 2015, regarding U.S. Appl. No. 14/479,319, 33 pages.

Lindahl et al., "Hydraulic Strut Assembly for Semi-Levered Landing Gear," U.S. Appl. No. 13/474,332, filed May 17, 2012, 98 pages.

Office Action, dated Sep. 13, 2012, regarding U.S. Appl. No. 12/730,598, 10 pages.

Notice of Allowance, dated Jan. 28, 2013, regarding U.S. Appl. No. 12/730,598, 5 pages.

Office Action, dated Dec. 21, 2012, regarding U.S. Appl. No. 13/031,525, 32 pages.

Notice of Allowance, dated Jul. 20, 2016, regarding U.S. Appl. No. 14/479,319, 13 pages.

Office Action, dated Aug. 25, 2016, regarding U.S. Appl. No. 14/697,621, 45 pages.

* cited by examiner

HYDRAULIC ACTUATOR FOR SEMI LEVERED LANDING GEAR

BACKGROUND INFORMATION

1. Field:

Embodiments of the present disclosure relate generally to landing gear and, more particularly, to a semi-levered landing gear and an associated method of positioning the bogie beam of the landing gear using an telescopic hydraulic actuator.

2. Background:

Many airplanes include landing gear to facilitate takeoff, landing and taxi. The landing gear of some aircraft includes a shock absorber that is pivotally attached to a bogie beam at a distal or lower end thereof. The bogie beam includes two or more axles upon which tires are mounted. In this regard, the bogie beam may include a forward axle positioned forward of the shock absorber and an aft axle positioned aft of the shock absorber. Upon takeoff, an airplane having a conventional landing gear with forward and aft axles will pivot about the pin that attaches the bogie beam to the shock absorber such that all of the landing gear tires have an equal load distribution.

In order to provide additional ground clearance for rotation of the aircraft during takeoff, semi-levered landing gear mechanisms have been developed. A semi-levered landing gear fixedly positions the shock absorber and the forward end of the bogie beam during takeoff such that the forward axle is in a raised position relative to the aft axle when the airplane has left the ground. As such, the aircraft pivots about the aft axle, rather than the pin that pivotally connects the bogie beam to the shock absorber, provided that the extend pressure of the shock absorber has been increased sufficiently. By rotating about the aft axle, the landing gear height is effectively increased so as to provide additional ground clearance for rotation of the aircraft during takeoff. As a result, the takeoff field length (TOFL) of the aircraft may be reduced, the thrust used by the engines may be reduced, or the weight carried by the aircraft may be increased while maintaining the same takeoff field length.

In order to provide for rotation of the aircraft about the aft axle during takeoff, a semi-levered landing gear locks the bogie beam in a "toes-up" attitude such that the tires mounted upon the aft axle support the aircraft, while the tires mounted upon the forward axle are raised above the surface of the runway. Following takeoff, the landing gear is generally stowed in a wheel well or the like. In order to fit within a conventional wheel well, the landing gear is typically unlocked and the bogie beam repositioned in a "stowed" attitude prior to retracting the landing gear into the wheel well. Thereafter, during landing, the landing gear is lowered and the bogie beam is repositioned such that the forward axle is higher than the aft axle. Upon touch down, all of the wheels, including both those on the forward axle and the aft axle, equally bear the weight of the aircraft. Typically, the locking and unlocking of a semi-levered gear system, and the resulting repositioning of the bogie beam relative to the shock absorber, occurs without input from the pilot or the flight control system.

One type of semi-levered landing gear utilizes a mechanical linkage to lock the bogie beam during takeoff, but uses a separate mechanical linkage, termed a shrink-link, to reposition the shock absorber for retraction into the wheel well. The use of a shrink-link disadvantageously increases the complexity, expense and weight of the resulting semi-levered landing gear. Mechanical linkages also may not provide sufficiently desired damping during landing or bogie beam pitch dampening while on the ground.

Another type of semi-levered landing gear includes a locking hydraulic strut to lock the bogie beam in the desired orientation for takeoff. The locking hydraulic strut is essentially a locking actuator, but has a number of additional chambers and an internal floating piston. See, for example, U.S. Pat. No. 6,345,564. While a semi-levered landing gear having a locking hydraulic strut is suitable for some aircraft, the landing gear of other aircraft may not have sufficient clearance or room for the hydraulic strut to be positioned between the shock absorber and the bogie beam in an efficient manner.

Accordingly, it would be desirable to provide an improved semi-levered landing gear hydraulic actuator that may be used on landing gears that do not have sufficient space for locating a conventional locking hydraulic strut configuration. In particular, it would be desirable to provide a semi-levered landing gear that is both weight and cost efficient and that is not overly complex, while still satisfying the various operational requirements of the semi-levered landing gear.

SUMMARY

The advantageous embodiments provide for a guide tube and a floating piston disposed within the guide tube. The floating piston is configured within the guide tube such that a landing gear connected to the floating piston may extend rapidly to the stow position relative to a mechanical device for retracting a landing gear.

The advantageous embodiments also provide for an actuator including a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. A manifold is connected to the first, second, and third hydraulic pistons. The manifold is disposed relative to the first, second, and third hydraulic pistons such that a fluid moving in the manifold can control positions of the first, second, and third hydraulic pistons.

The embodiments also provide for a vehicle including a fuselage, a wing connected to the fuselage, and a landing gear assembly connected to at least one of the fuselage and the wing. The vehicle further includes a hydraulic actuator connected to the landing gear assembly. The hydraulic actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. The hydraulic actuator further includes a manifold connected to the first, second, and third hydraulic pistons. The manifold is disposed relative to the first, second, and third hydraulic pistons such that a fluid moving in the manifold can control positions of the first, second, and third hydraulic pistons.

The embodiments also provide for a method for operating a vehicle. The vehicle includes a fuselage, a wing connected to the fuselage, and a landing gear assembly connected to one of the fuselage or the wing. An actuator is connected to the landing gear assembly. The actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. A manifold is connected to the first, second, and third hydraulic pistons. The manifold is disposed relative to the first, second, and third hydraulic pistons such that a fluid moving in the manifold can control positions of the first, second, and third hydraulic pistons.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The present invention now will be described more fully hereinafter with reference to the accompanying drawings, in which preferred advantageous embodiments of the invention are shown. This invention may, however, be embodied in many different forms and should not be construed as limited to the advantageous embodiments set forth herein; rather, these advantageous embodiments are provided so that this disclosure will be thorough and complete, and will fully convey the scope of the invention to those skilled in the art. Like numbers refer to like elements throughout.

The advantageous embodiments recognize these issues and present a solution that is flexible, durable, relatively inexpensive compared to other struts, and light weight. Additionally, the advantageous embodiments have added further value to aircraft operation in that the advantageous embodiments aid an aircraft in both landing and lift off. The advantageous embodiments aid an aircraft to lift off by increasing the angle of the attack of the aircraft. The angle of attack is the angle at which an aircraft is attempting to lift off from the ground into the air. The advantageous embodiments aid an aircraft to land by providing additional bogie beam pitch dampening. Other advantageous embodiments are apparent from the following additional description.

Specifically, advantageous embodiments of the present disclosure relate generally to landing gear assemblies and, more particularly, to a semi-levered landing gear assembly and an associated method of positioning the bogie beam of the landing gear assembly using a telescopic actuator. However, the advantageous embodiments may also apply to other vehicles and may be used in other applications aside from vehicles. Thus, the advantageous embodiments are not limited to use in landing gears or landing gear assemblies.

Figure 1:
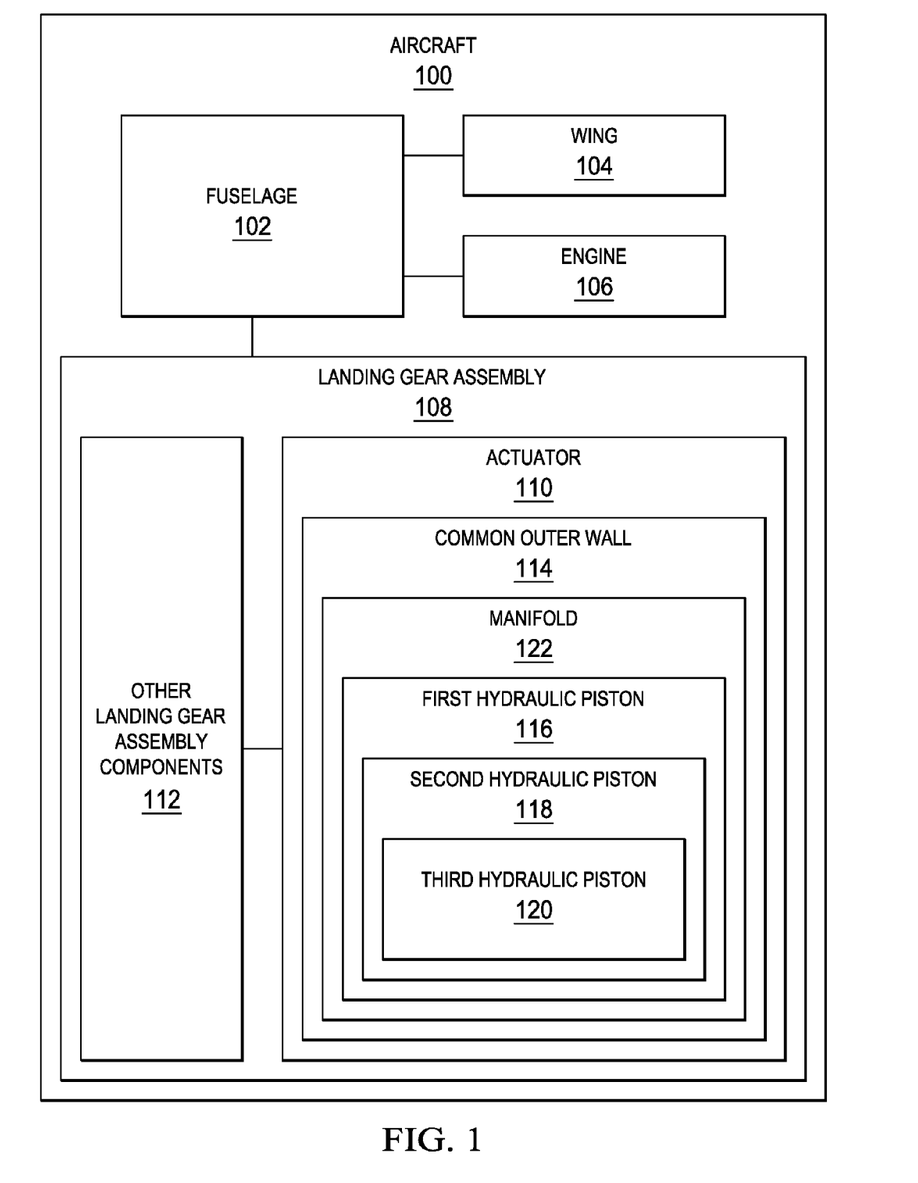
FIG. 1 is an illustration of a block diagram of an aircraft, in accordance with an advantageous embodiment.

FIG. 1 is an illustration of a block diagram of an aircraft in which an advantageous embodiment may be implemented. While FIG. 1 may be used to describe an aircraft incorporating the advantageous embodiments, aircraft 100 may also potentially be any other vehicle in which a hydraulic strut or hydraulic piston might be used.

Aircraft 100 includes fuselage 102, to which is connected to wing 104. In a non-limiting advantageous embodiment, aircraft 100 may include engine 106. In another advantageous embodiment, landing gear assembly 108 may be connected to one of wing 104 or fuselage 102, or even possibly engine 106, or possibly combinations thereof. Aircraft 100 may include many other components. In an advantageous embodiment, landing gear assembly 108 may include actuator 110 and other landing gear assembly components 112.

Actuator 110 may include a nested series of hydraulic pistons sharing common outer wall 114. Thus, for example, actuator 110 may include first hydraulic piston 116, second hydraulic piston 118, and third hydraulic piston 120. In an advantageous embodiment, the three hydraulic pistons are concentric. In an advantageous embodiment, the three hydraulic pistons may actuate in a telescopic manner such that, when fully extended, second hydraulic piston 118 extends past a top of the third hydraulic piston 120, and second hydraulic piston 118 extends past a top of first hydraulic piston 116. Actuator 110 also includes manifold 122. Manifold 122 may be contained within common outer wall 114; however, manifold 122 may be connected in some other way to the first, second, and third hydraulic pistons. In any case, manifold 122 is disposed relative to the first, second, and third hydraulic pistons (116, 118, and 120) such that a fluid moving in manifold 122 can control positions of the first, second, and third hydraulic pistons (116, 118, and 120). Examples of such a fluid flow are detailed below with respect to FIGS. 2 through 5.

Other arrangements are also possible. In other advantageous embodiments, one or more of the hydraulic pistons might be replaced by some other kind of piston, such as an electromechanical piston.

In an advantageous embodiment, at least two of the first, second, and third hydraulic pistons may share a common fluid source. In other advantageous embodiments, all three hydraulic pistons share a common fluid source. In an advantageous embodiment, more or fewer hydraulic pistons may be present. Thus, for example, four or more nested hydraulic pistons might be provided, though in another advantageous embodiment only two nested hydraulic pistons might be provided.

In an advantageous embodiment, the different hydraulic pistons might have different operating pressures. Thus, for example, third hydraulic piston 120 might maintain a constant pressure having a first value, whereas the second hydraulic piston 118 might maintain a constant return pressure having a second value different than or the same as the first value. However, pressures may vary; for example, the first hydraulic piston 116 might be configured to operate at variable pressures between third and fourth values different than the first and second values. Other combinations of operating pressures are possible.

The illustration of aircraft 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
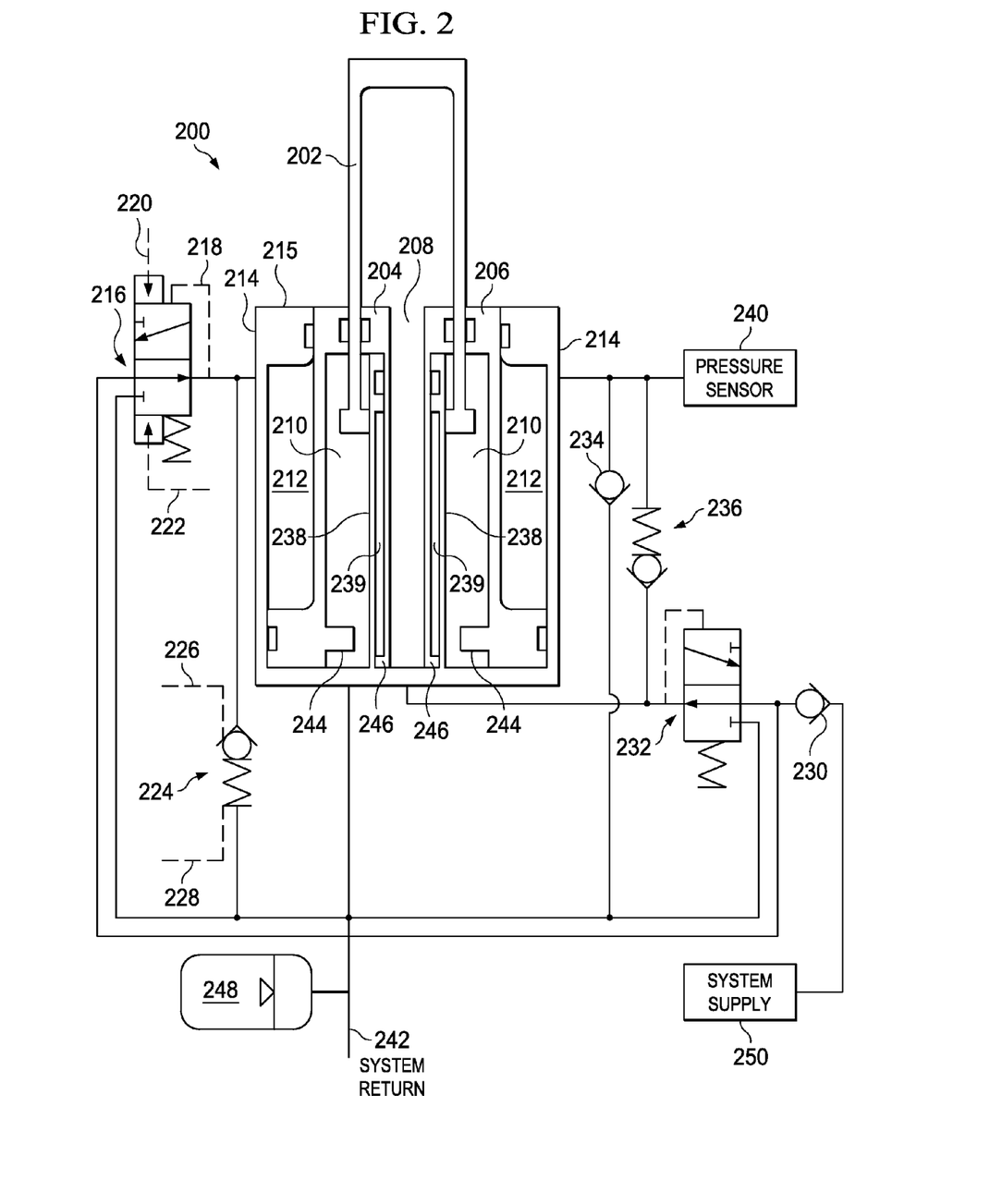
FIG. 2 is an illustration of a hydraulic actuator, in accordance with an advantageous embodiment.

FIG. 2 is an illustration of a hydraulic actuator, in accordance with an advantageous embodiment. Hydraulic actuator assembly 200 shown in FIG. 2 may be actuator 110 shown in FIG. 1. Likewise, other components may correspond between FIG. 1 and FIG. 2. For example, first piston 206 may correspond to first hydraulic piston 116, second piston 202 may correspond to second hydraulic piston 118, third piston 204 may correspond to third hydraulic piston 120, and common outer wall 214 may correspond to common outer wall 114.

In the advantageous embodiment shown in FIG. 2, first piston 206, second piston 202, and third piston 204 are concentric to each other. Each hydraulic piston has a corresponding pressure chamber. Thus, for example, second piston 202 and third piston 204 share chamber 208, and first piston 206 has chamber 210. The space between common outer wall 214 and first piston 206 define chamber 212. These chambers may operate at the same or different pressures, variable pressures, or a combination of constant and variable pressures, all of which may be the same or different.

Figure 8:
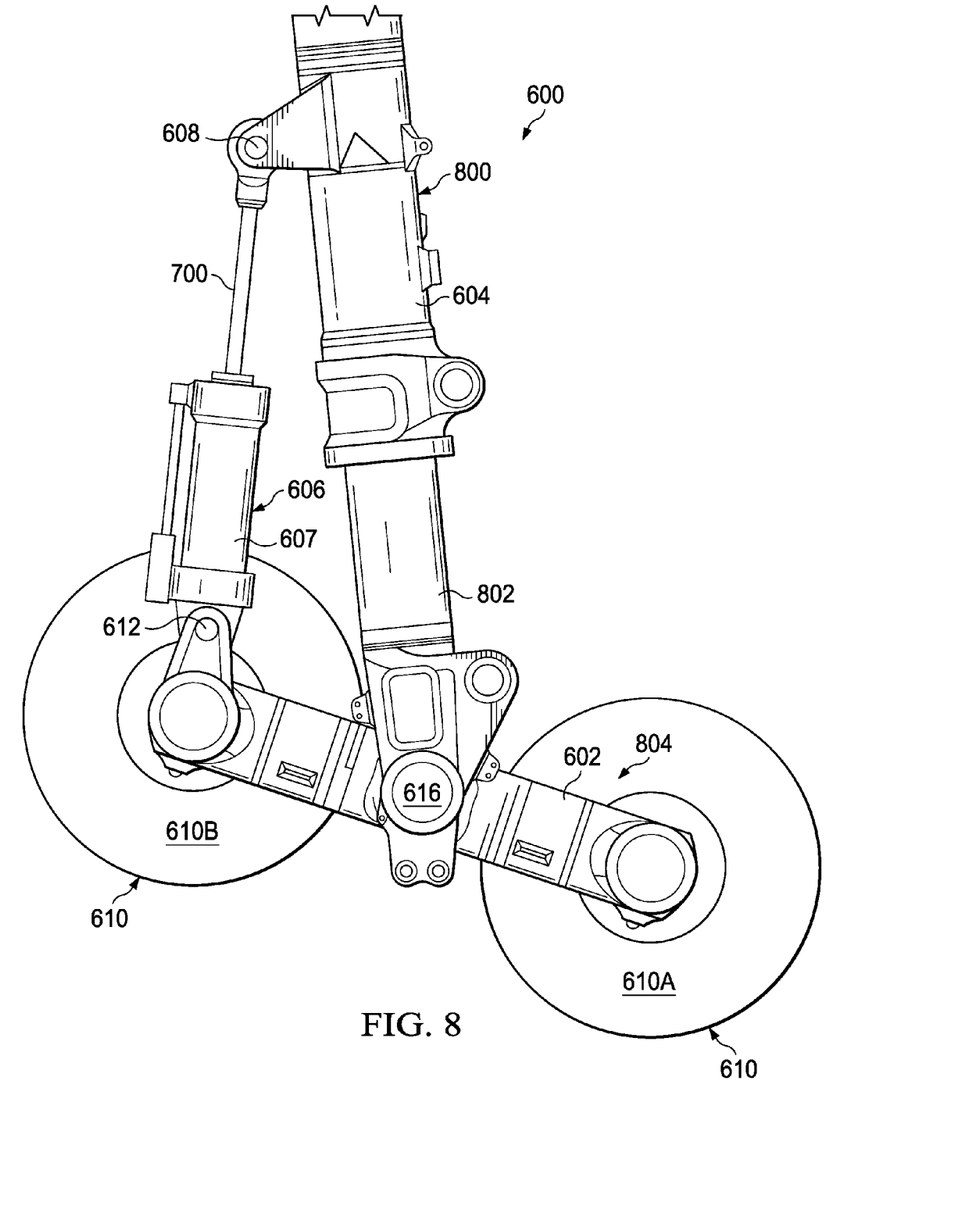
FIG. 8 is an illustration of a landing gear assembly in the landing position, in accordance with an advantageous embodiment.

In a non-limiting advantageous embodiment, the purpose of hydraulic actuator assembly 200 is to act as a fixed length tension member during takeoff, as shown in FIG. 8. In this configuration, hydraulic actuator assembly 200 may be referred to as a hydraulic strut. During takeoff roll, the load on the landing gear assembly is reduced as the wings generate lift. The reduced load on the landing gear shock absorber 604 may cause the lower portion 802 of the shock absorber 604 to extend such that the bogie beam 602 is forced to pivot about upper lug pivot 612 rather than about the main pivot 616 so as to provide a semi-levered function to the landing gear assembly 600. As a result, the aircraft may experience a greater ground clearance, which in turn allows the airplane to rotate to a greater angle of attack on takeoff.

Figure 3:
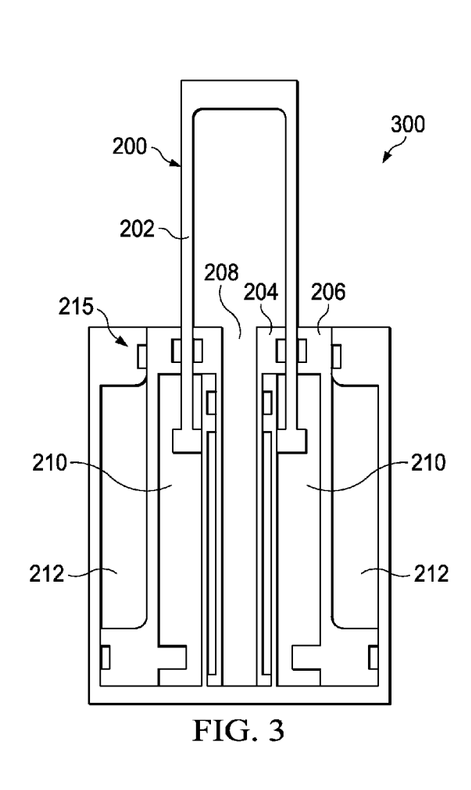
FIG. 3 is an illustration of a hydraulic actuator in a static position (airplane on the ground) for an on-ground condition, in accordance with an advantageous embodiment.
Figure 4:
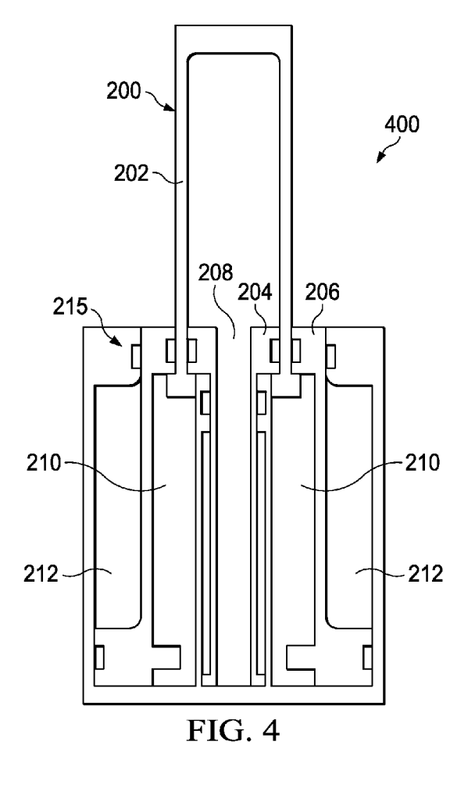
FIG. 4 is an illustration of a hydraulic actuator in a lock-up position, in accordance with an advantageous embodiment.

In a non-limiting advantageous embodiment, to perform the semi-levered function of a hydraulic actuator, chamber 212 is filled with fluid to an advantageous pressure greater than the fluid pressure in chamber 210. This result is shown in FIGS. 3 and 4. The greater fluid pressure in chamber 212 causes the first piston 206 to be fully retracted inside the cylinder barrel 215. FIG. 3 shows the on-ground configuration where the first piston 206 is fully retracted, but the second piston 202 and the third piston 204 may move, allowing fluid to pass in and out of chambers 210 and 208. This movement of fluid in and out of chambers 210 and 208 provides dampening, which is an advantageous function to resist bogie beam pitch about main pivot 616 of FIGS. 6 through 8.

During takeoff roll, the load on the landing gear assembly is reduced as the wings generate lift. The reduced load on the landing gear shock absorber causes the lower portion of the shock absorber 802 to extend. The extending motion of the shock absorber causes the hydraulic actuator assembly 200 to extend to the position shown in FIG. 4. In this position, the second piston 202 is pulled against stops on the end of first piston 206. This position achieves the semi-lever functionality of the hydraulic actuator and landing gear assembly.

Referring to FIG. 3 in conjunction with the above description of FIG. 2, in this advantageous embodiment, the hydraulic actuator assembly 200 passively transitions from position 300 to position 400 in response to the loads applied to the aircraft and landing gear assembly. This transition may not require any input from the pilots, crew, or any other mechanical, electrical device to achieve this desirable functionality. This passive operation reduces mechanical and hydraulic complexity and increases reliability.

Figure 5:
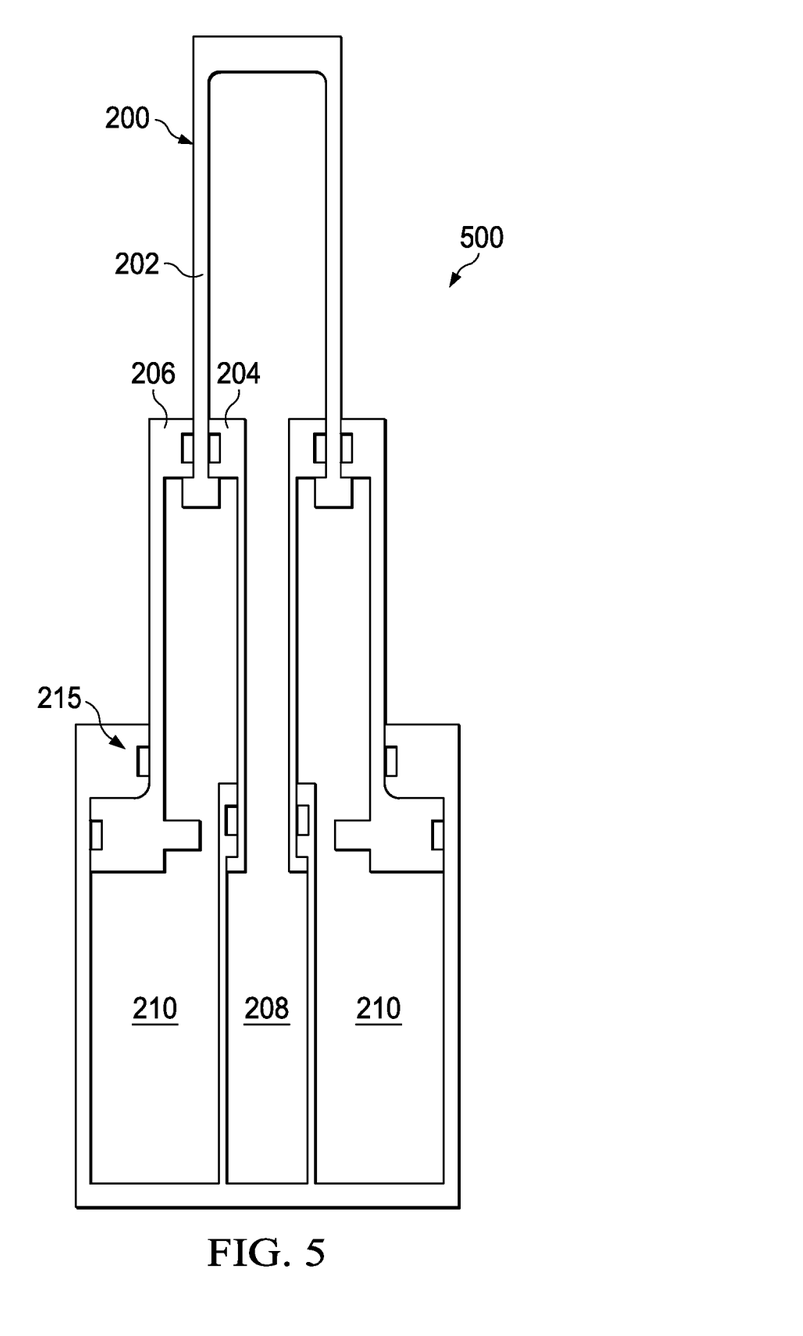
FIG. 5 is an illustration of a hydraulic actuator in a fully extended position for stowing, in accordance with an advantageous embodiment.

Hydraulic actuator assembly 200 may have other functions. For example, hydraulic actuator assembly 200 may aid in positioning the bogie beam 602 of FIGS. 6 through 8, to different positions of varying lengths, such as stow or landing positions. In typical large aircraft configurations, it is advantageous to position the bogie beam 602 of FIG. 7 in an attitude where the forward axle is lower than the aft axle for storage in a wheel well. In this instance, the hydraulic actuator assembly 200 can be lengthened to position 500 as shown in FIG. 5. This position is achieved by decreasing the fluid pressure in chamber 212, which allows the pressure in chamber 208 to extend the hydraulic actuator assembly 200. In this manner, passages in the manifold allow the fluid in chamber 212 to exit the chamber. In some instances it may be advantageous to integrate the command to assume position 500 with the landing gear assembly retraction command such that the hydraulic actuator commands position 500 automatically when the pilot commands the landing gear assembly to be retracted.

Hydraulic actuator assembly 200 may allow for extension during landing touchdown to allow a change in bogie beam pitch to facilitate air-ground sensing. Hydraulic actuator assembly 200 may provide damping during landing to limit loads into the other parts of the aircraft. Hydraulic actuator assembly 200 may provide bogie beam pitch damping, as shown further in FIG. 6.

Returning to FIG. 2, the second piston 202 may operate with a constant pressure, such as about 2000 pounds per square inch (psi) in one non-limiting advantageous embodiment (possibly more or fewer psi) by pressuring the fluid in chamber 208 accordingly. The constant pressure may be selected to provide sufficient force to position a bogie beam to stow, while not producing excessive force while on the ground, which could undesirably load the tires.

In an advantageous embodiment, the third piston 204 may maintain a constant downward force due to pressure in chamber 208 being greater than chamber 210. This force may reduce the extend forces and reduce the areas that experience system pressure.

In an advantageous embodiment, the first piston 206 may operate at variable pressures by varying the pressure of the fluid in chamber 212. The pressure in chamber 212 may be varied depending on the mode of operation of the hydraulic actuator assembly 200. For example, a relatively low pressure of about 500 psi may be used in chamber 212 for landing to allow the bogie beam to move for air-ground sensing, though higher or lower pressure might be used for this purpose depending on the aircraft and design considerations. On the other hand, chamber 212 may operate at about 3000 to about 5000 psi, or greater, in order to lock the hydraulic actuator assembly 200. In this case, the hydraulic actuator assembly 200 may act as a tension member during lift off rotation of the strut. Later, a reduced pressure of system return in chamber 212 may cause the strut to telescopically extend the nested hydraulic pistons 206, 204, and 202 while bringing the strut to a stow position.

In an advantageous embodiment, the second piston 202 may be referred to as a main piston, and the first piston 206 may be referred to as a telescopic piston, and the third piston 204 may be referred to as a floating piston. In an advantageous embodiment, the floating piston 204 and guide tube 238 may define chamber 239 which is common with chamber 208 that may greatly reduce the hydraulic flow used to reposition the hydraulic actuator assembly 200. As a result, the time used to extend the hydraulic actuator assembly 200 for stowing in the wheel well may be advantageously reduced since the flow into chamber 208 from system supply 250 is much less than if chamber 210 had to be filled using system supply 250.

Attention is now turned to pressure ranges with respect to hydraulic actuator assembly 200. In the advantageous embodiment shown, pressure ranges are for a system operating between about 500 psi and 5000 psi, though other ranges might be suitable and could vary by as much as about 0 psi to about 10,000 psi or more. These pressures are approximate and may vary with each specific operation or implementation. Seals are not shown, but conventional seals may be used in each groove shown in hydraulic actuator assembly 200.

In an advantageous embodiment, multi-mode reducer 216 may provide three outlet pressures using a single valve, as shown. These pressures might be 0 psi, 500 psi, and 5000 psi, as indicated at dashed sensing line 218. The single value may provide three outlet pressures by using a standard pressure reducer and adding solenoid valve input 220 and solenoid valve input 222 to either end as shown. Solenoid valve input 220 and solenoid valve input 222 may be actuated to drive the valve to be fully on or fully off. When solenoid valve input 220 is on, then the pressure may be about 0 psi. When solenoid valve input 222 is on, then the pressure may be about 5000 psi. When both solenoid valve input 220 and solenoid valve input 222 are off, multi-mode reducer 216 may perform as a normal reducer, outputting about 500 psi in this example. The about 500 psi may be low enough to hold the bogie beam in a landing attitude but still allow the bogie beam to move at touchdown, allowing the aircraft to use initial bogie beam motion to trigger landing spoilers.

Multi-mode relief valve 224 may be an adaptation of a common relief valve with solenoid valve inputs, which may be the same valve inputs used in multi-mode reducer 216. Thus, for example, solenoid valve input 226 may cause the relief valve to be opened, for use in the stow position, and solenoid valve input 228 may be used to put the relief valve into its high pressure setting. The solenoid valve input 228 may increase the cracking pressure from about 1000 psi to about 5500 psi by increasing the spring pre-load. A use for the multi-mode relief valve 224 may be to provide touchdown damping in order to reduce loads in the fuselage and other parts of the airframe, which saves weight. During touchdown, the first piston 206 and the second piston 202 may be pulled out rapidly. Fluid from the rod end of chamber 212 may exit through the multi-mode relief valve 224, which may be sized to provide the proper damping rate.

A pressure sensor 240 may be used to verify that the hydraulic actuator assembly 200 is locked. If the pressure sensor senses that pressure is near maximum system pressure, then the hydraulic actuator assembly 200 may react to the full tension load during lock-up. Note that if the seals are damaged, full pressure would not be achieved, thereby providing an advantageous method of testing the integrity of the hydraulic actuator assembly 200.

Check valve 230 may be a check valve that may trap fluid in hydraulic actuator assembly 200 in order to hold the hydraulic actuator assembly 200 in the stow position, which may be the fully extended position. In an advantageous embodiment, the hydraulic pressure may be removed from the landing gear system after the gear is retracted, and check valve 230 also holds the bogie beam in position while the landing gear system is tucked into the wheel well.

Reducer 232 may provide reduced pressure to the chamber 208. This reduced pressure may be selected so as to avoid overloading the front tires while the aircraft is on the ground, but being sufficient pressure to power the strut to the stow position when gear up is selected. A possible alternative advantageous embodiment may be to provide a solenoid input to reducer 232 in order to shut reducer 232 off while the aircraft is on the ground. In this advantageous embodiment, the tires may be equally loaded.

Check valve 234 may be used in an alternate extension case, such as where the landing gear assembly is extended by alternate means after hydraulic system loss. This use may leave the hydraulic actuator assembly 200 fully extended so that the aircraft may land with front tires down. This landing procedure may cause a rapid compression of the hydraulic actuator assembly 200. The second piston 202 may move first, which may force fluid out of chamber 210 and back towards reducer 232. In this case, the fluid in chamber 208 may also flow to system return 242. In an advantageous embodiment, accumulator 248 may be provided for surge suppression.

In any case, relief valve 236 may allow the fluid in chamber 208 to flow to the rod end of the first piston 206 (this is chamber 212), forcing the first piston 206 down. This action starts the first piston 206 moving before the second piston 202 reaches the first piston 206, which reduces impact loads. If the fluid flow from chamber 210 exceeds the return line capacity, then that flow may flow through the check valve 234 to the rod end cavity, further aiding the motion of the first piston 206. When the second piston 202 reaches the first piston 206, the second piston 202 may contact stop 244.

In an advantageous embodiment, the third piston 204 may be contained within the second piston 202, in which case guide tube 238 may extend from the head end of the hydraulic actuator assembly 200. In this case, the third piston 204 may have a stop 246 that prevents the third piston 204 from departing from the tube if the third piston 204 attempts to over-extend.

Figure 6:
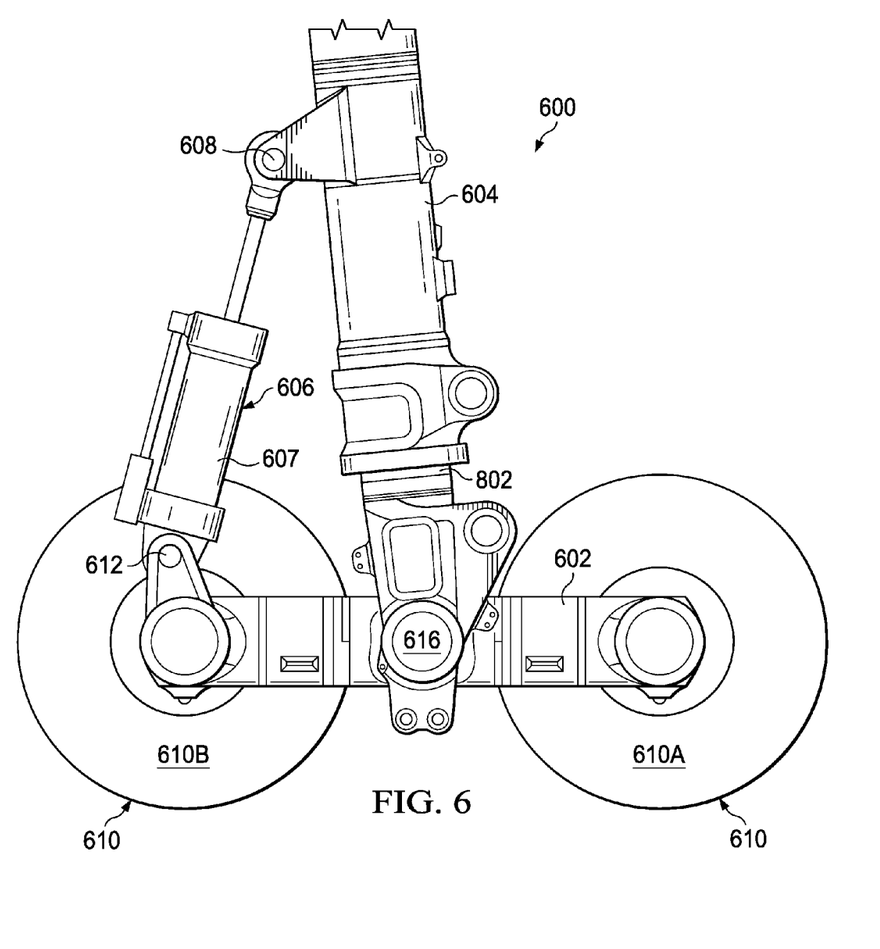
FIG. 6 is an illustration of a landing gear assembly in the static position (airplane on the ground), in accordance with an advantageous embodiment.
Figure 7:
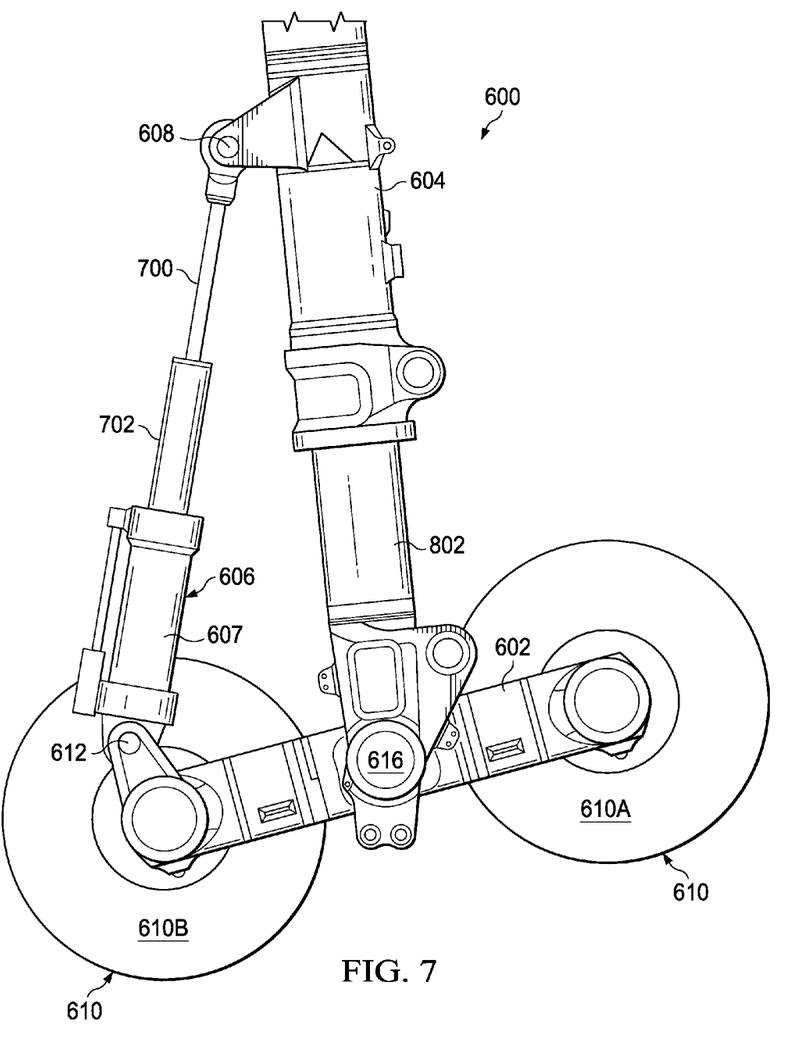
FIG. 7 is an illustration of a landing gear assembly in the stow position, in accordance with an advantageous embodiment.

Thus, FIG. 2 depicts one advantageous embodiment of hydraulic strut 606 of FIGS. 6 through 8 in greater detail. Hydraulic actuator assembly 200 includes a cylinder barrel 215, a first piston 206 slidably received through an open end of the cylinder barrel 215, and second piston 202 slidably received through an open end of first piston 206. The second piston 202 may include at least one lug or other connecting member at its upper end for attachment to the landing gear assembly upper half, as shown in FIGS. 6 through 8. The cylinder barrel 215 may include at least one lug or other connecting member at its lower end for attachment to bogie beam 602 at upper lug pivot 612, both of FIGS. 6 through 8. The cylinder barrel 215 also contains a guide tube 238 that is fixed to the cylinder barrel 215. A floating piston, third piston 204, is contained within the second piston 202 and the guide tube 238. The upper end of cylinder barrel 215 sealingly engages with the outer surface of first piston 206. The lower end of the first piston 206 sealingly engages with the inner surface of the cylinder barrel 215.

The cylinder barrel 215 includes fluid passages as shown in FIG. 2 to supply chambers 212 and 210 with pressurized fluid. These passages and chambers constitute a manifold contained within the common outer wall, the manifold is disposed relative to the first, second, and third hydraulic pistons such that a fluid moving in the manifold can control positions of the first, second, and third hydraulic pistons. The features of the hydraulic manifold shown in FIG. 2 allow the pressures in chambers 212 and 210 to be changed such that the first piston 206 may be forced in or out of the cylinder barrel 215 in a desirable manner. Note that the manifold may take other forms. For example, the manifold may be a series of possibly different (more or fewer than those shown) chambers connected in some other way to the first, second, and third hydraulic pistons. In any case, the manifold is disposed relative to the first, second, and third hydraulic pistons such that a fluid moving in the manifold can control positions of the first, second, and third hydraulic pistons.

The upper end inside surface of first piston 206 sealingly engages with the outer surface of the second piston 202. The inside surface of second piston 202 sealingly engages with the upper outside surface of third piston 204. The upper end inside surface of the guide tube 238 sealingly engages with the outer surface of the third piston 204. The cylinder barrel 215 includes fluid passages as shown in FIG. 2 to supply chambers 208 and 210, and 212 with pressurized fluid. The features of the hydraulic actuator assembly 200 shown in FIG. 2 allow the pressures in chambers 208 and 210 and 212 to be changed such that the second piston may be forced out of the first piston 206 in a desirable manner and both second piston 202 and third piston 204 can be extended together.

As implied above, the nested pistons shown in hydraulic actuator assembly 200 may have different arrangements to achieve different functions. Furthermore, different valves, reducers, and other hydraulic components may be arranged to change how hydraulic fluids flow within the various fluid chambers of hydraulic actuator assembly 200, again to achieve different functions. Thus, the advantageous embodiments are not limited by the particular arrangements described with respect to FIG. 2.

FIG. 3 through FIG. 5 are illustrations of a hydraulic actuator in use, in accordance with an advantageous embodiment. The advantageous embodiments shown in FIG. 3 through FIG. 5 correspond to the hydraulic actuator assembly 200 shown in FIG. 2. Therefore, reference numerals in FIG. 3 through FIG. 5 sharing the same value as the reference numerals in FIG. 2 may correspond to the same components and may have similar structure and functions. Not all components described with respect to FIG. 2 are necessarily shown with respect to FIGS. 3 through 5; however, all such components may be present in some advantageous embodiments.

The advantageous embodiments shown in FIG. 3 through FIG. 5 show hydraulic actuator assembly 200 in use. In FIG. 3, the hydraulic actuator assembly 200 has a position 300 for use while the aircraft is on the ground. In FIG. 4, the hydraulic actuator assembly 200 has a position 400. In FIG. 5, the hydraulic actuator assembly 200 has a position 500.

In the advantageous embodiment shown in position 300, the chamber 208 may have a pressure of about 2000 psi, but that value may be more or less. The chamber 210 is at the return pressure, which may be a constant pressure. The chamber 212 may have a pressure of about 500 psi. In this arrangement, third piston 204 and first piston 206 are held down by pressure in chambers 208 and 212. Second piston 202 is free to move as the bogie beam moves.

This position of hydraulic actuator assembly 200 may be advantageous when the airplane is on the ground. The position may be advantageous because the hydraulic actuator assembly 200 allows for normal bogie beam pitch motion without excessive loads in the hydraulic actuator. Furthermore, the hydraulic actuator may be arranged so as to avoid impacting against a lockup position to avoid overloading the front tires. Additionally, the hydraulic actuator may be short enough to prevent overload of the hydraulic actuator in the event of an unexpected condition such as one or more tires on the aft landing gear axles experiencing lowered air pressure.

In the advantageous embodiment shown in position 400, the pressure in chamber 208 and chamber 210 is maintained, but the pressure in chamber 212 may be increased so as to restrain first piston 206 in a fully compressed position. Position 400 is advantageous during takeoff. Position 400 is advantageous on takeoff because hydraulic actuator assembly 200 has a fixed length, which has the effect of pulling up on the front of the bogie beam as the landing gear shock absorber pushes down, which causes the rear tires to be forced down. As a result, the effective lengths of the landing gear assembly is longer at the point of rotation, which allows the airplane to rotate to a higher angle of attack.

During landing, position 400 causes hydraulic actuator assembly 200 to see an initial tension load. In this manner, position 400 may act as a damper during initial touchdown.

In position 500, the pressure in chamber 212 is removed so that the pressure in chamber 208 will fully extend second piston 202. The extension of second piston 202 will pull third piston 204 to its full extended position. As a result, hydraulic actuator assembly 200 reaches maximum telescopic extension of each of the three hydraulic pistons such that the top of second piston 202 extends past the top of third piston 204. Position 500 is advantageous because this position orients the bogie beam in the desirable attitude to fit inside the wheel well. No supply pressure is present and no single issue or change in the hydraulic actuator assembly configuration can cause large retraction forces.

FIGS. 6 through 8 illustrate a landing gear assembly in three different positions in several advantageous embodiments. FIG. 6 illustrates a landing gear assembly 600 in the ground position; FIG. 7 illustrates landing gear assembly 600 in the stow position; and FIG. 8 illustrates landing gear assembly 600 in a landing position. Reference numerals in FIGS. 6 through 8 sharing the same value as the reference numerals may correspond to similar components and may have similar structure and functions. In one possible non-limiting advantageous embodiment, the same components among FIGS. 6 through 8 may be the same and have the same functions. The advantageous embodiments shown in FIGS. 6 through 8 are non-limiting examples of one possible use of hydraulic actuator assembly 200 shown in FIGS. 2 through 5. A possible operation of landing gear assembly 600 in conjunction with hydraulic strut 606 is described with respect to FIGS. 2 through 5.

Turning first to FIG. 7, an illustration of a landing gear assembly in the stow position is shown, in accordance with an advantageous embodiment. Landing gear assembly 600 includes hydraulic strut 606. Hydraulic strut 606 may be the same or similar to hydraulic actuator assembly 200 shown in FIG. 2 through FIG. 5. The advantageous embodiment shown in FIG. 7 is a non-limiting example of one possible use of hydraulic actuator assembly 200 shown in FIGS. 2 through 5. A possible operation of landing gear assembly 600 in conjunction with hydraulic strut 606 is described with respect to FIGS. 2 through 5.

Turning now to FIG. 6, hydraulic strut 606 is shown in the ground configuration, which may correspond to position 300 shown in FIG. 3. Landing gear assembly 600 also shows other features, some of which are described above with respect to FIGS. 2 through 5. These features include bogie beam 602 attached to the lower portion of shock absorber 604. Lug 608 is attached to the cylinder portion of shock absorber 604. Plurality of wheels 610 are attached to bogie beam 602. Plurality of wheels 610 may include forward wheels 610B and aft wheels 610A. Hydraulic strut 606 is pivotally attached to the upper portion of shock absorber 604 at lug 608. Hydraulic strut 606 is pivotally attached to bogie beam 602 at lower lug pivot 612. Shock absorber 604 is attached to bogie beam 602 by main pivot 616. In use, lug 608 and lower lug pivot 612 allow hydraulic strut 606 to move in two different orientations with respect to shock absorber 604 and bogie beam 602. In use, main pivot 616 allows the ends of bogie beam 602 to pivot upwardly and downwardly with respect to shock absorber 604.

FIG. 7 also depicts the hydraulic strut 606 with the second piston 700 (corresponding to second piston 202 of FIG. 2) pivotally attached to the upper portion of the shock absorber 604 via lug 608. The cylinder barrel 607 (corresponding to cylinder barrel 215 of FIG. 2) of hydraulic strut 606 is pivotally attached to the bogie beam at the lower lug pivot 612. In other advantageous embodiments, the hydraulic strut 606 may be reoriented such that the second piston (700/202) may be attached to the upper lug pivot 612 to the bogie beam 602 and the cylinder barrel (215/607) may be attached to the cylinder portion of the shock absorber 604.

As shown in FIG. 7, hydraulic strut 606 is actuated such that second piston (700/202) and telescopic, first piston (702/206) are extended. In an embodiment, both are fully extended. In this orientation, one end of bogie beam 602 is forced downwardly about main pivot 616. This orientation and operation is described further with respect to FIGS. 2 through 5.

After liftoff, the hydraulic strut 606 positions the landing gear assembly 600 at an angle, such that the forward axle is lower than the aft axle, as shown in FIG. 7. In an advantageous embodiment, the angle may be twelve degrees, though this value may be varied between less than a degree to eighty degrees or more. Hydraulic strut 606 may be repositioned quickly to landing position shown in FIG. 8 using the small flow required to fill chamber 208 of FIG. 2.

Later, the hydraulic strut 606 may be hydraulically de-energized. While in the wheel well, the hydraulic strut 606 may maintain the fully extended position with no supply pressure. The return pressure in chamber 210 may aid in this function. While in this position, no single failure may cause large retraction forces.

Turning now to FIG. 8, the hydraulic strut 606 is depicted with the second piston 700 (corresponding to second piston 202 of FIG. 2) pivotally attached to the upper portion of the shock absorber 604 via lug 608. The cylinder barrel 607 (corresponding to cylinder barrel 215 of FIG. 2) of hydraulic actuator 606 is pivotally attached to the lower lug pivot 612 which is attached to the bogie beam. In other advantageous embodiments, the hydraulic strut 606 may be reoriented such that the second piston (700/202) may be attached to the lower lug pivot 612 to the bogie beam 602 and the cylinder barrel (215/607) may be attached to the cylinder portion of the shock absorber 604 at lug 608.

As shown in FIG. 8, hydraulic strut 606 is pulled such that second piston (700/202) is extended. In this orientation, one end of bogie beam 602 is forced downwardly about main pivot 616, in a direction opposite that shown in FIG. 7. In an advantageous embodiment, the angle may be 23 degrees, though this value may be varied to suit the requirements of the vehicle. This orientation and operation is described further below, and with respect to FIGS. 2 through 5.

Before landing, the hydraulic strut 606 positions the landing gear assembly from position 500 (FIG. 5) to position 400 (FIG. 4) by retracting the first piston 206, such that the forward axle is higher than the aft axle. This position tilts the bogie beam 602 for a landing position. In this position, the hydraulic strut 606 is restrained with a prescribed amount of force by pressure in chamber 212 of FIG. 2.

During landing, the aft tires will contact the ground first, causing the bogie beam to rotate about main pivot 616. This motion may cause hydraulic strut 606 to experience an initial high tension load. Hydraulic strut 606 may move with initial low resistance to allow an air-ground sensing system to detect the change in pitch of the bogie beam. As the shock absorber 604 compresses, the bogie beam will continue to rotate about main pivot 616 until the forward tires contact the ground. Once the forward tires touch the ground, the hydraulic strut 606 may experience rapid compression. Hydraulic strut 606 may act as a damper during initial touchdown. In an advantageous embodiment, hydraulic strut 606 may allow the aircraft to land when hydraulic strut 606 is in a fully extended position, if no hydraulic pressure is available, in order to provide for an alternate landing position.

While on the ground, the hydraulic strut 606 allows for normal pitch motion of bogie beam 602 around a main pivot 616 without excessive loads in the hydraulic strut 606 and without overloading the front tires. In an advantageous embodiment, hydraulic strut 606 may collapse short enough to prevent any unexpected conditions from impairing landing gear assembly 600 or the aircraft.

Figure 9:
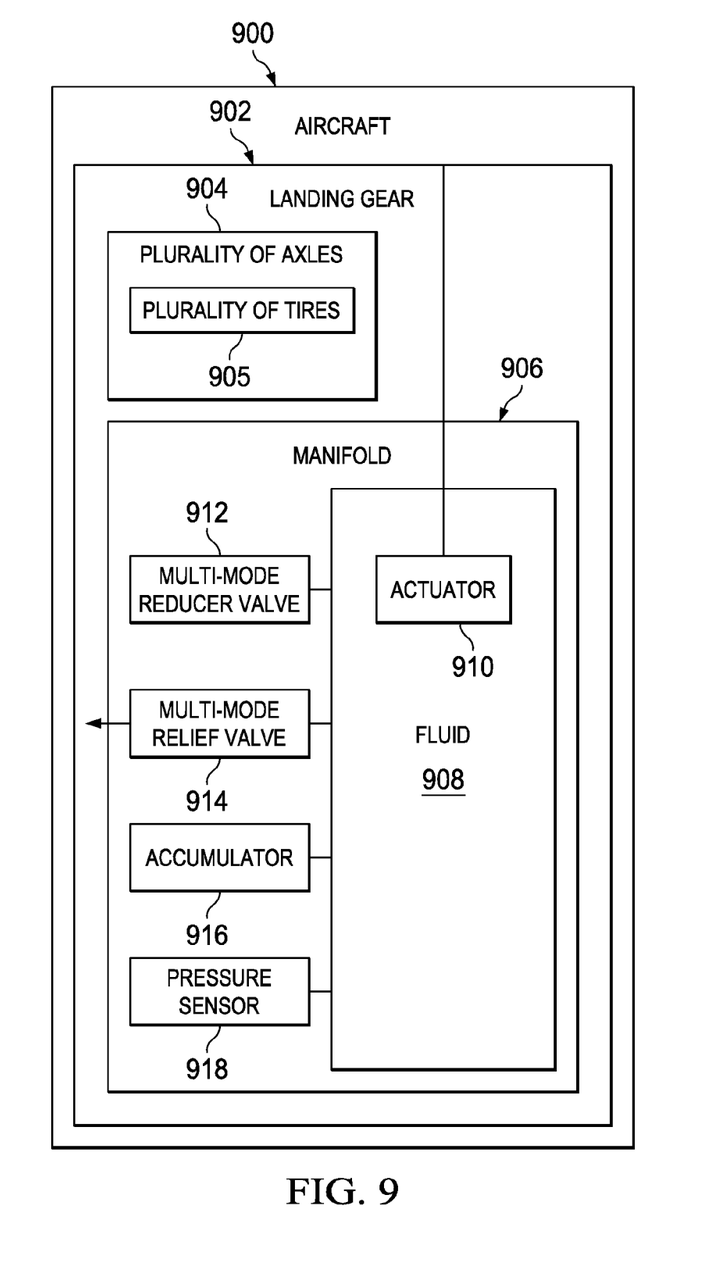
FIG. 9 is an illustration of a block diagram of an aircraft, in accordance with an advantageous embodiment.

Considering FIGS. 7 through 9 together, a semi-levered landing gear assembly 600 in accordance with an advantageous embodiment of the invention is shown. The landing gear assembly 600 includes a shock absorber 604 of suitable construction to absorb and damp transient loads exerted between the gear and the ground during ground operations of an aircraft, and to support the aircraft when stationary on the ground. The shock absorber 604 typically includes an upper portion 800 and a lower portion 802 that is telescopingly received in the upper portion such that the length of the shock absorber 604 can vary depending on the amount of load applied to the landing gear assembly in a direction along the axis of the shock absorber. On initial touchdown, as shown in FIG. 8, the amount of load applied to the landing gear assembly 600 is relatively small and, accordingly, the length of the shock absorber 604 is about at a maximum.

The landing gear assembly 600 further includes a wheel truck 804 formed by at least one bogie beam 602 pivotally attached at main pivot 616 to a lower portion 802 of the shock absorber 604. A plurality of wheels 610 are rotatably supported by the bogie beam 602, including at least one forward wheel and at least one aft wheel respectively supported at a forward end and an aft end of the bogie beam 602. In general, for most large aircraft, the wheel truck of a main landing gear assembly may include a plurality of wheels 610, which may include a pair of forward wheels on an axle at the forward end of bogie beam 602 and a pair of aft wheels on an axle at the aft end of bogie beam 602. Some advantageous embodiments may include a plurality of wheels on one or more additional axles between the forward and aft axles. However, the advantageous embodiments described herein are applicable to any wheel truck configuration having at least one wheel supported by a bogie beam at a location that is longitudinally displaced forward or aft of a main pivot at which a shock absorber is attached to the bogie beam.

The landing gear assembly 600 also includes a hydraulic strut 606, which may be hydraulic actuator assembly 200 of FIG. 2. Hydraulic strut 606 is pivotally connected at its upper end to the lug 608 at the shock absorber 604 and has its lower end pivotally connected at lower lug pivot 612 on the bogie beam 602 at a location forward of main pivot 616. The hydraulic strut 606 is a variable-length device enabling the bogie beam 602 to pivot relative to the shock absorber 604. Additionally, the hydraulic strut 606 is capable of locking up to a fixed length, when suitably controlled as further described above, such that the bogie beam 602 is forced to pivot about lower lug pivot 612 rather than about main pivot 616, so as to provide a semi-levered function to the landing gear assembly 600.

FIG. 9 is an illustration of a block diagram of an aircraft, in accordance with an advantageous embodiment. Aircraft 900 shown in FIG. 9 may be, for example, aircraft 100 shown in FIG. 1. The various components described with respect to FIG. 9 may also be found in FIGS. 2 through 8, as described further below.

Aircraft 900 includes landing gear 902, which may include a plurality of axles 904 upon which a plurality tires 905 are disposed. Landing gear 902 may have, in other embodiments, one or more axles including one or more tires. Landing gear 902 may be, in some embodiments, landing gear assembly 108 of FIG. 1 or landing gear assembly 600 of FIGS. 6 through 8. Plurality of axles 904 may be, for example, part of bogie beam 602 of FIGS. 6 through 8. Plurality of tires 905 may be, for example, plurality of wheels 610 of FIGS. 6 through 8.

Landing gear 902 may also include manifold 906. An actuator 910 is disposed within manifold 906. Actuator 910 is configured within manifold 906 such that landing gear 902, connected to actuator 910, may retract rapidly. The term "rapid" is defined relative to a speed at which a mechanical device, or other device, would be capable of retracting the same or similar landing gear 902. In an advantageous embodiment, the pressure of fluid 908 may be varied and then applied to the actuator 910 such that landing gear 902 is restrained in a landing position by actuator 910 when the pressure applied to the actuator 910 is configured to allow for air-ground sensing during touchdown of the aircraft 900.

Fluid 908 may be, for example, the fluid that flows through a manifold disposed with respect to manifold 906. In a particular example, fluid 908 may flow within chambers, such as chambers 208, 210, and 212 of FIGS. 2 through 5. Actuator 910 may take other forms, as well, such as additional pistons in a nested piston arrangement.

In an embodiment, manifold 906 may include multi-mode reducer valve 912. Multi-mode reducer valve 912 may be, for example, multi-mode reducer 216 of FIG. 2. Multi-mode reducer valve 912 may be configured to allow variable pressure settings for fluid.

In an embodiment, manifold 906 may include multi-mode relief valve 914. Multi-mode relief valve 914 may be, for example, multi-mode relief valve 224 of FIG. 2. Multi-mode relief valve 914 may be configured to allow fluid 908 to exit manifold 906. In another embodiment, multi-mode relief valve 914 may be configured to reduce a pressure of fluid 908 while aircraft 900 is on the ground in order to balance loads among the plurality of axles 904.

In an embodiment, an accumulator 916 may be disposed with respect to manifold 906 such that accumulator 916 absorbs pressure spikes during touchdown of the aircraft 900. Accumulator 916 may be, for example, accumulator 248 of FIG. 2.

In an embodiment, pressure sensor 918 may be connected to at least one of manifold 906 and actuator 910. Pressure sensor 918 may be configured to monitor a health of landing gear 902. Pressure sensor 918 may be, for example, pressure sensor 240 of FIG. 2.

The illustration of aircraft 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
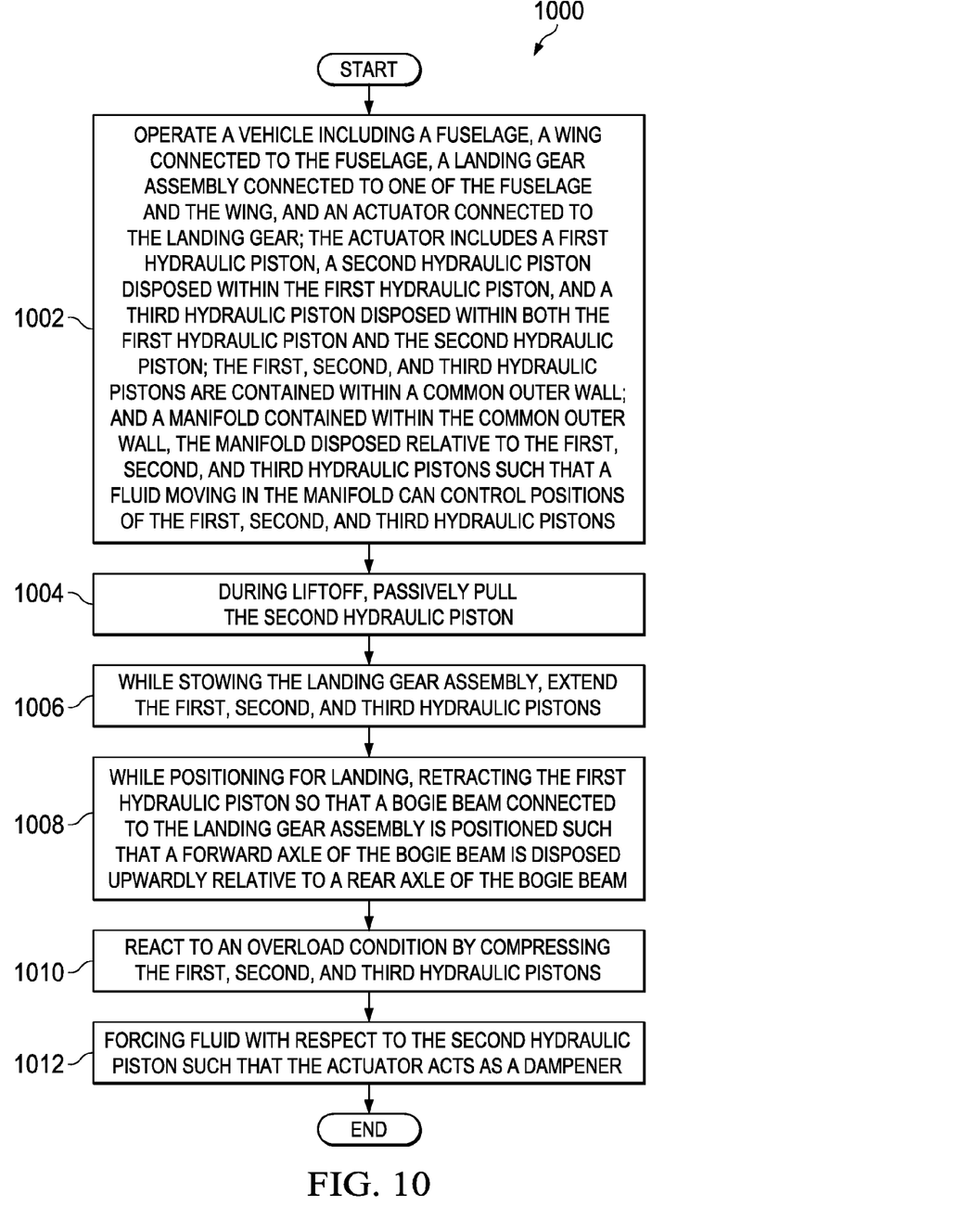
FIG. 10 is an illustration of a flowchart of a method of operating a hydraulic actuator in an aircraft, in accordance with an advantageous embodiment.

FIG. 10 is an illustration of a flowchart of a method of operating a hydraulic actuator in an aircraft, in accordance with an advantageous embodiment. The process shown in FIG. 10 may be implemented using a hydraulic piston assembly 200, such as that shown in FIG. 2 through FIG. 5, or may be implemented using a hydraulic strut 606, such as that shown in FIGS. 6 through 8.

The process 1000 begins by operating a vehicle, the vehicle comprising: a fuselage; a wing connected to the fuselage; a landing gear assembly connected to one of the fuselage and the wing; an actuator connected to the landing gear assembly, wherein the actuator comprises: a first hydraulic piston; a second hydraulic piston disposed within the first hydraulic piston; and a third hydraulic piston disposed within both the first hydraulic piston and the second hydraulic piston, wherein the first, second, and third hydraulic pistons are contained within a common outer wall; and a manifold contained within the common outer wall, the manifold disposed relative to the first, second, and third hydraulic pistons such that a fluid moving in the manifold can control positions of the first, second, and third hydraulic pistons (operation 1002). In an advantageous embodiment the method may include, during liftoff, passively pulling the second hydraulic piston (operation 1004). In an advantageous embodiment, the method may further include, while stowing the landing gear assembly, extending the first, second, and third hydraulic pistons (operation 1006).

In an advantageous embodiment, the method may further include, while positioning for landing, retracting the first hydraulic piston so that a bogie beam connected to the landing gear assembly is positioned such that a forward axle of the bogie beam is disposed upwardly relative to a rear axle of the bogie beam (operation 1008). In an advantageous embodiment, the method may further include reacting to an overload condition by compressing the first, second, and third hydraulic pistons (operation 1010). In an advantageous embodiment, the method may further include forcing fluid with respect to the second hydraulic piston such that the actuator acts as a dampener (operation 1012). The process terminates thereafter.

Thus, the advantageous embodiments provide for an actuator. The actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall.

The advantageous embodiments present provide for a nested piston actuator that is flexible, durable, light weight, and relatively inexpensive compared to other actuators. Additionally, the advantageous embodiments have added further value to aircraft operation in that the advantageous embodiments aid an aircraft in both landing and lift off. The advantageous embodiments aid an aircraft to lift off by increasing the height of the landing gear assembly at the time of initial take-off rotation, which allows a higher angle of the attack, Other advantageous embodiments are apparent from the following additional description.

The flowcharts and block diagrams in the different depicted advantageous embodiments illustrate the architecture, functionality, and operation of some possible implementations of apparatus and methods in different advantageous embodiments. In this regard, each block in the flowchart or block diagrams may represent a module, segment, function, and/or a portion of an operation or step. The advantageous embodiments may be manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

The description of the different advantageous embodiments has been presented for purposes of illustration and description, and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various advantageous embodiments with various modifications as are suited to the particular use contemplated.

What is claimed is:

1. A device comprising:
   a first hydraulic piston;
   a second hydraulic piston disposed within the first hydraulic piston; and
   a third hydraulic piston disposed within both the first hydraulic piston and the second hydraulic piston, the third hydraulic piston comprising a floating piston, and wherein the first, second, and third hydraulic pistons are contained within a common outer wall; and
   a manifold connected to the first, second, and third hydraulic pistons, the manifold disposed relative to the first, second, and third hydraulic pistons such that a fluid moving through the manifold can control positions of the first, second, and third hydraulic pistons.

2. The device of claim 1, wherein the common outer wall includes a guide tube configured to separate fluid volumes within chambers of the device.

3. The device of claim 2, wherein the common outer wall includes a guide tube configured to separate fluid volumes within chambers of the device and wherein the floating piston is configured within the guide tube such that a landing gear connected to the floating piston may extend rapidly relative to a mechanical device for repositioning a landing gear for retraction into a wheel well, that does not contain the floating piston and the guide tube.

4. The device of claim 3 further comprising:
   an aircraft connected to the landing gear.

5. The device of claim 4 further comprising:
   a multi-mode relief valve connected to the manifold, wherein the multi-mode relief valve is configured to reduce a pressure of fluid in one or more of the first, second, and third hydraulic pistons while the aircraft is on the ground.

6. The device of claim 4 further comprising:
   an accumulator disposed with respect to the manifold such that the accumulator absorbs pressure spikes during touchdown of the aircraft.

7. The device of claim 4 further comprising:
   a pressure sensor connected to the manifold, wherein the pressure sensor is configured to monitor the health of the device.

8. The device of claim 1, wherein at least two of the first, second, and third hydraulic pistons share a common fluidic source.

9. The device of claim 1, wherein the first, and second, hydraulic pistons are configured to be actuated telescopically such that, in a fully extended position, the second hydraulic piston extends past the top of the first hydraulic piston, and the first hydraulic piston extends past the common outer wall of the actuator.

10. The device of claim 1, wherein the third hydraulic piston in conjunction with the guide tube creates a smaller chamber common to the second piston.

11. The device of claim 1, wherein the third hydraulic piston moves independently of the first and second hydraulic pistons.

12. The device of claim 1, wherein the first hydraulic piston can be extended or retracted within the common outer wall by force of different fluid pressures applied to either end of the first hydraulic piston.

13. The device of claim 4 further comprising:
   a multi-mode pressure reducer valve connected to the manifold, wherein the multi-mode reducer valve is configured to reduce a pressure of fluid acting on one or more of the first, second, and third hydraulic pistons to provide either full system pressure for lock-up for takeoff or reduced pressure for enhanced air-ground sensing.

14. The device of claim 1, wherein the first hydraulic piston is configured to resist applied forces tending to extend or compress the first hydraulic piston.

15. The device of claim 1, wherein fluid pressure can be varied to provide for air-ground sensing during touchdown of the aircraft.

16. The device of claim 1, wherein the device is further configured such that fluid in the second hydraulic piston can move to the first hydraulic piston upon command, and such that fluid in the first hydraulic piston can move to the second hydraulic piston upon command.

17. The device of claim 1, wherein the device is further configured such that fluid in the first, second, and or third hydraulic piston can move out of the device automatically, wherein fluid moving out of the device reduces a load in the device.

18. The device of claim 1, wherein the device is part of a landing gear assembly of an aircraft.

19. A vehicle comprising:
a fuselage;
a wing connected to the fuselage;
a landing gear assembly connected to at least one of the fuselage and the wing; and
a hydraulic actuator connected to the landing gear assembly, wherein the hydraulic actuator comprises:
a first hydraulic piston;
a second hydraulic piston disposed within the first hydraulic piston; and
a third hydraulic piston disposed within both the first hydraulic piston and the second hydraulic piston, the third hydraulic piston comprising a floating piston, and wherein the first, second, and third hydraulic pistons are contained within a common outer wall, the common outer wall including a guide tube configured to separate fluid volumes within chambers of the device; and
a manifold connected to the first, second, and third hydraulic pistons, the manifold disposed relative to the first, second, and third hydraulic pistons such that a fluid moving in the manifold can control positions of the first, second, and third hydraulic pistons.

* * * * *